US006441512B1

(12) United States Patent
Jakel et al.

(10) Patent No.: US 6,441,512 B1
(45) Date of Patent: Aug. 27, 2002

(54) VEHICLE DOOR LATCHING APPARATUS

(75) Inventors: Donald Paul Jakel; Eric John Nelson; Steven Thomas Will, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/531,790

(22) Filed: Mar. 21, 2000

(51) Int. Cl.[7] ............................................ B60R 25/00

(52) U.S. Cl. ................................................ 307/10.2

(58) Field of Search ............................ 307/10.1, 10.2, 307/10.3; 292/DIG. 3, DIG. 4, DIG. 5, DIG. 23; 70/284, 285

(56) References Cited

U.S. PATENT DOCUMENTS 3,796,889 A * 3/1974 Frakin et al. ........... 307/10 AT
4,549,448 A * 10/1985 Kittle ........................ 74/710.5
6,191,682 B1 * 2/2001 Wolfgang .................. 340/5.2

* cited by examiner

*Primary Examiner*—Matthew Nguyen
(74) *Attorney, Agent, or Firm*—Roy W. Truelson

(57) ABSTRACT

A sensor detects a possible attempt to open a vehicle door latch by mechanical means, and temporarily disables an electronic unlocking signal until the mechanical activation means are absent. Preferably, all functions are performed by an on-board microprocessor controller, which checks the state of the door sensor(s) upon occurrence of an unlock event. If the sensor(s) indicate that a person is or may be attempting to open the door mechanically, no unlock signal is transmitted immediately to the door latch. Preferably, the controller continues to check the state of the door sensor(s), and activates the unlock mechanism after the sensor is clear. However, if the sensor is not clear within some timeout period, the controller may simply abort the unlock operation. This is done to avoid confusing the user with an unlocking action some time after pressing the unlock switch.

13 Claims, 3 Drawing Sheets

VEHICLE DOOR LATCHING APPARATUS

FIELD OF THE INVENTION

The present invention relates to electronic control apparatus, and in particular to apparatus for controlling the locking and unlocking of vehicle doors in response to electronic signals.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. As the capabilities of computers have increased, the price of resources necessary to perform a given computing task has declined precipitously. This has made it possible to put computer capability in applications that were unthinkable not long ago.

One such application is the control and monitoring of motor vehicles. Most modern motor vehicles have at least one on-board microprocessor, which is in fact a small computer.

The microprocessor may be used, e.g., for controlling air/fuel mixtures, engine ignition timing, or other variables which affect engine performance. It may also be used for controlling systems not directly related to engine operation, such as an air conditioner. It may even be used for applications which are not strictly control systems at all, such as providing information to the driver about vehicle location, weather, diagnostics, and so forth.

Since a motor vehicle is a very complex machine, the possible applications for on-board vehicle computers are enormous. As computer capabilities improve and decline further in price, it is reasonable to apply on-board computer systems to a larger number of tasks. Such tasks need not be absolutely necessary for vehicle operation. Tasks which simply improve the ease and comfort of the users are appropriate for computer applications. It is expected that many such tasks are not performed today, and being merely conveniences, the need, such as it is, is not recognized. However, continued progress in the art means that today's luxuries are tomorrow's conveniences, and that eventually these may be seen as necessities. The electric starter motor was initially regarded as such a luxury, yet it would be hard to imagine an automobile today without one.

Many modern automobiles are equipped with electronically activated door latches. These may be activated by a portable remote control device transmitting a low-power radio signal, or may be activated by a switch which is an integral part of the vehicle, and is directly connected to the vehicle's wiring. Such activation mechanisms may activate multiple doors simultaneously. Typically, a door latch may be locked or unlocked, and the door may be opened, by purely mechanical means (such as pulling on a handle within the vehicle to unlock and open the door). The electronic latching mechanism activates a solenoid, which forces motion in a mechanical part of the latch, thus providing an alternative means for locking or unlocking the latch.

The existence of alternate mechanical and electrical means has the potential to cause conflicts. If one person attempts to open a door latch by mechanical means, while another simultaneously attempts to unlock it electronically, the latch may fail to unlock. Because each person may not realize immediately what the other is doing, there may be multiple unsuccessful attempts to unlock the door, until one realizes what is going on and lets the other proceed. Furthermore, depending on the design of the latch, it is even possible for the latch to enter an intermediate state from which it can not be directly unlocked, but most fist be returned to the locked state (e.g., by activating a "lock" switch), and then unlocked.

An unrecognized need exists for the application of on-board computer technology to prevent or reduce the occurrence of such annoying behavior.

SUMMARY OF THE INVENTION

A sensor detects a possible attempt to open a vehicle door latch by mechanical means, and temporarily disables an electronic unlocking signal until the mechanical activation means are absent.

Preferably, all functions are performed in the vehicle's on-board microprocessor controller. An electronic signal to unlock a door is routed through the microprocessor, and will not activate the door lock without some positive action on the part of the microprocessor. Upon occurrence of an unlock event, such as receipt of an unlock signal or a predefined automatic unlock event, the controller checks the state of the door sensor(s). If the sensor(s) indicate that a person is or may be attempting to open the door mechanically, no unlock signal is transmitted immediately to the door latch. In this case, the controller may issue an audible beep to the user.

Preferably, the controller continues to check the state of the door sensor(s), and will activate the unlock mechanism after the sensor is clear. However, if the sensor is not clear within some timeout period, the controller will simply stop checking and will not activate the latch electronically. This is done to avoid confusing the user with an unlocking action some time after pressing the unlock switch. It would alternatively be possible to not use a time-out, i.e., if the sensor is not immediately clear, no signal is transmitted, or to use an "infinite" timeout, in which case the controller unlocks the door whenever it is clear, no matter how long it takes.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
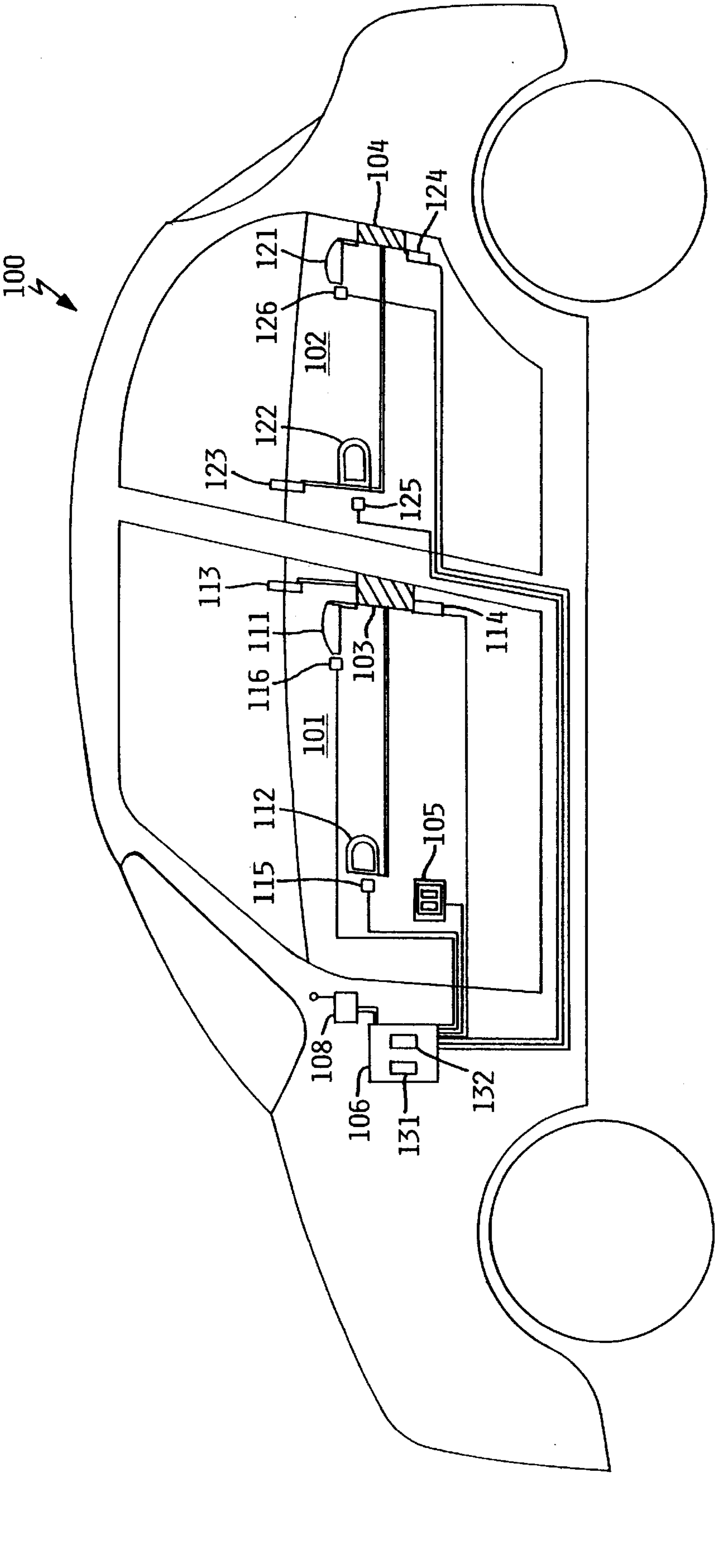
FIG. 1 illustrates the major components of a vehicle latching mechanism, according to the preferred embodiment of the present invention.

Referring to the Drawing, wherein like numbers denote like parts throughout the several views, FIGS. 1 shows the major components of a vehicle door latching mechanism, in accordance with the preferred embodiment of the present invention. As shown in FIG. 1, a motor vehicle 100 such as a passenger automobile contains multiple doors 101, 102, of which only two are visible in the diagram for simplicity of illustration, it being understood that the vehicle could have doors on both sides. Each door contains a door lock mechanism, which is illustrated generically in FIG. 1 as features 103 and 104. Each lock mechanism 103, 104 contains moveable parts, such as cams, levers, springs, and the like, which cause, it to engage a compatible catch (not shown) rigidly mounted to the frame of vehicle 100. Such door lock mechanisms are well known in the art, and vary considerably in design. The present invention is not intended to be limited to any particular door lock mechanism design.

Door lock mechanism 103 is mechanically coupled to an external door pull 111, mounted on the exterior side of door 101, for opening door 101 while a person is outside the vehicle. Door lock mechanism 103 is further mechanically coupled to an internal door pull 112, placed on the interior side of the door, for opening door 101 from within the vehicle. Door lock mechanism 103 is further mechanically coupled to a lock pin 113 placed on the interior side of the door, for manually placing the lock in a locked or unlocked state. The lock mechanism 103 may also be placed in a locked or unlocked state from the exterior of the vehicle by inserting and turning a key in a key cylinder (not shown), the key cylinder being mechanically coupled to door lock mechanism 103, as is well known. Door 102 similarly contains external pull 121, internal pull 122 and lock pin 123. As used herein, "mechanically coupled" means coupled entirely by a series of mechanical linking parts such as levers, rods, cams, gears, wheels, springs, pulleys and the like, and without any intermediate electronic components which transmit a user's desired action as an electrical signal.

An electrically activated unlocking device 114, such as a solenoid, is coupled to door lock 103. Device 114 is hereinafter referred to as a solenoid, it being understood that its construction need not be cylindrical, and that any mechanism which changes the state of the lock in response to electrical signals could be used. Solenoid 114 receives an electrical signal from controller 106 to unlock the door, causing door lock 103 to move to an unlocked state. A similar solenoid 124 is coupled to door lock 104. A single solenoid may be used for both locking and unlocking, or separate solenoids may be used.

On the interior of the driver's door 101 is placed a switchpad 105 containing one or more door lock switches for locking and unlocking the doors. Preferably, switchpad 105 contains switches for unlocking all doors in the vehicle. This may be implemented as a single global unlock switch which simultaneously unlocks all doors, or as a set of individual switches, one corresponding to each door. Switchpad 105 is shown only on the driver's door; however, it would be possible to place a switchpad on other doors. Swtichpad 105 is coupled to controller 106 by one or more wires.

Within the vehicle is also a small radio frequency receiver (RF receiver) 108, which is also coupled to controller 106. RF receiver 108 receives a radio signal transmitted by a battery-powered portable low-power transmitter device (not shown), used for locking and unlocking the doors. Such a device may, e.g., attach to a user's key chain, and may have additional functions such as trunk release or a "panic" function which causes lights to flash and horn to operate.

Controller 106 senses a signal to unlock one or more doors from either switchpad 105 or RF receiver 108, and transmits a signal to solenoids 114, 124, in response thereto, causing the solenoids to unlock the door locks. Additionally, there may be certain defined conditions under which controller should automatically unlock the doors. For example, if vehicle 100 is involved in a collision, it may automatically deploy air bags and unlock doors. It may further automatically unlock doors when the vehicle ignition switch is turned off. Sensors or other hardware necessary for detecting such automatic conditions are known in the art, and are not shown in FIG. 1.

As shown in FIG. 1, a sensor 115, 116, 125, 126 is positioned adjacent each respective door pull 112, 111, 122, 121, each sensor being coupled to controller 106. Sensors 115, 116, 125, 126 sense a possible attempt to activate the respective door pull manually. As described herein, controller 106 checks the state of sensors 115, 116, 125, 126 before attempting to unlock the doors, and may delay or abort an unlock signal depending on the sensor state.

The present invention is not limited to any particular sensor design, and sensors 115, 116, 125, 126 are shown conceptually in FIG. 1. Perhaps the simplest form of sensor is a contact switch, which is in a first state when the corresponding door pull is in a relaxed position, and in a second state when the corresponding door pull is in a pulled-out or partially pulled-out position. However, many different types of sensors are possible, e.g., magnetic, capacitive, optical, piezoelectric, etc. As described herein, the sensor senses a "possible attempt" to activate the door pull, meaning that the sensor does not read the user's mind, but detects some physical manifestation of the user's intent, such as motion of the door pull, force on some part of the door pull, proximity of an object such as a hand to the door pull, etc. Sensors 115, 116, 125, 126 are shown adjacent the door pulls, but they could alternatively be located at the door locks 103, 104, or at any intermediate position. Furthermore, depending on the design of the door lock and linkage, and the sensor location, it may be possible to detect motion of either door handle 111, 112 with a common sensor. Finally, in many vehicles the interior door pull 112 is designed to automatically unlock lock 103 when manually operated, if lock 103 is initially in a locked state. In such cases, sensor 115 may be superfluous.

Controller 106 preferably comprises a programmable microprocessor 131 executing a control program. The control program is stored in a non-volatile read-only memory (ROM) 132. While microprocessor 131 and ROM 132 are shown in FIG. 1 as separate entities, they could in fact be implemented on a single integrated circuit chip. The control program may perform numerous other functions, as are known in the art, the operation of door latches being only a small part of the total functions performed by the controller.

Figure 2A:
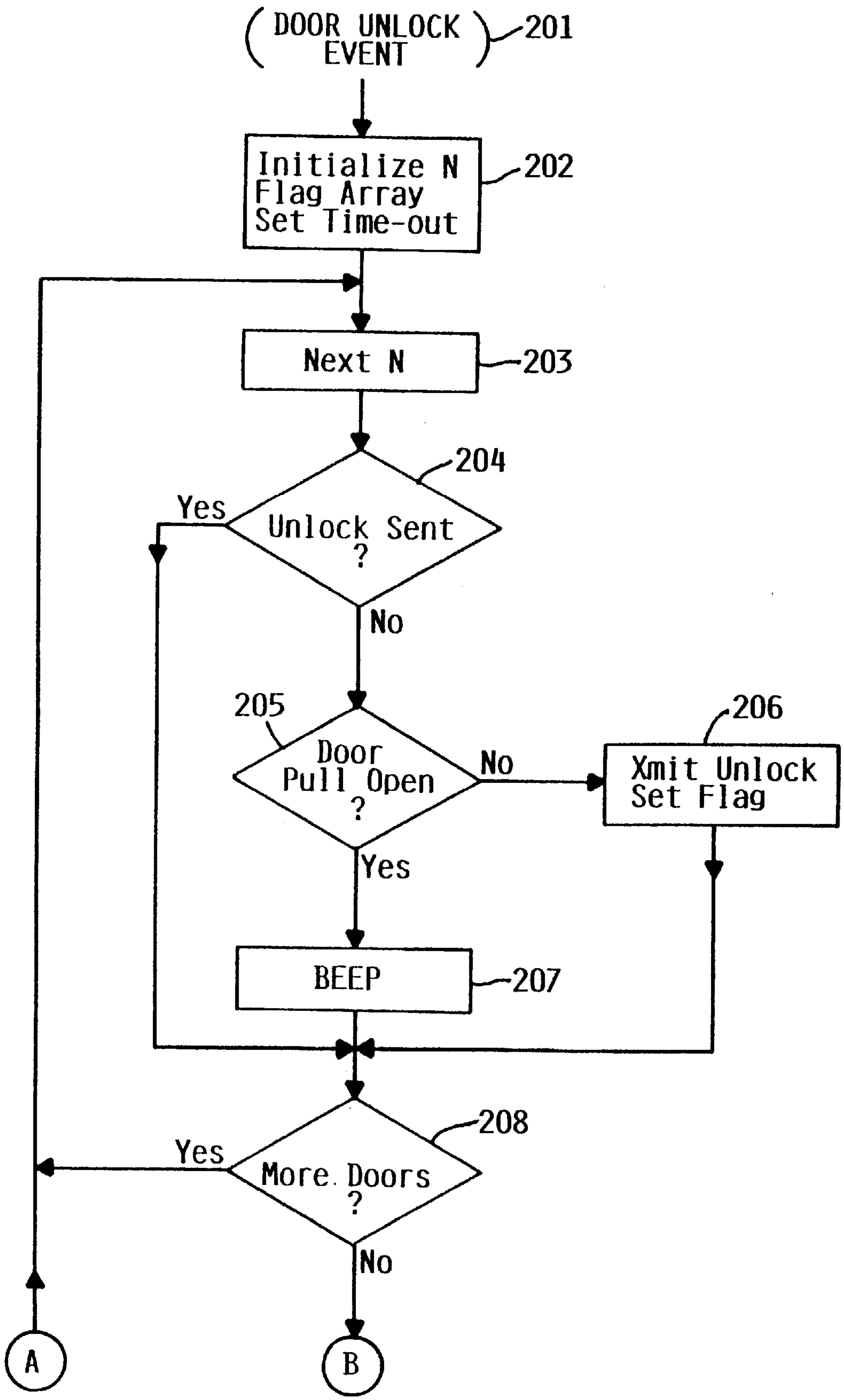
FIG. 2 is a flowchart showing the steps performed by the control program to control the door latch mechanism, in accordance with the preferred embodiment.
Figure 2B:
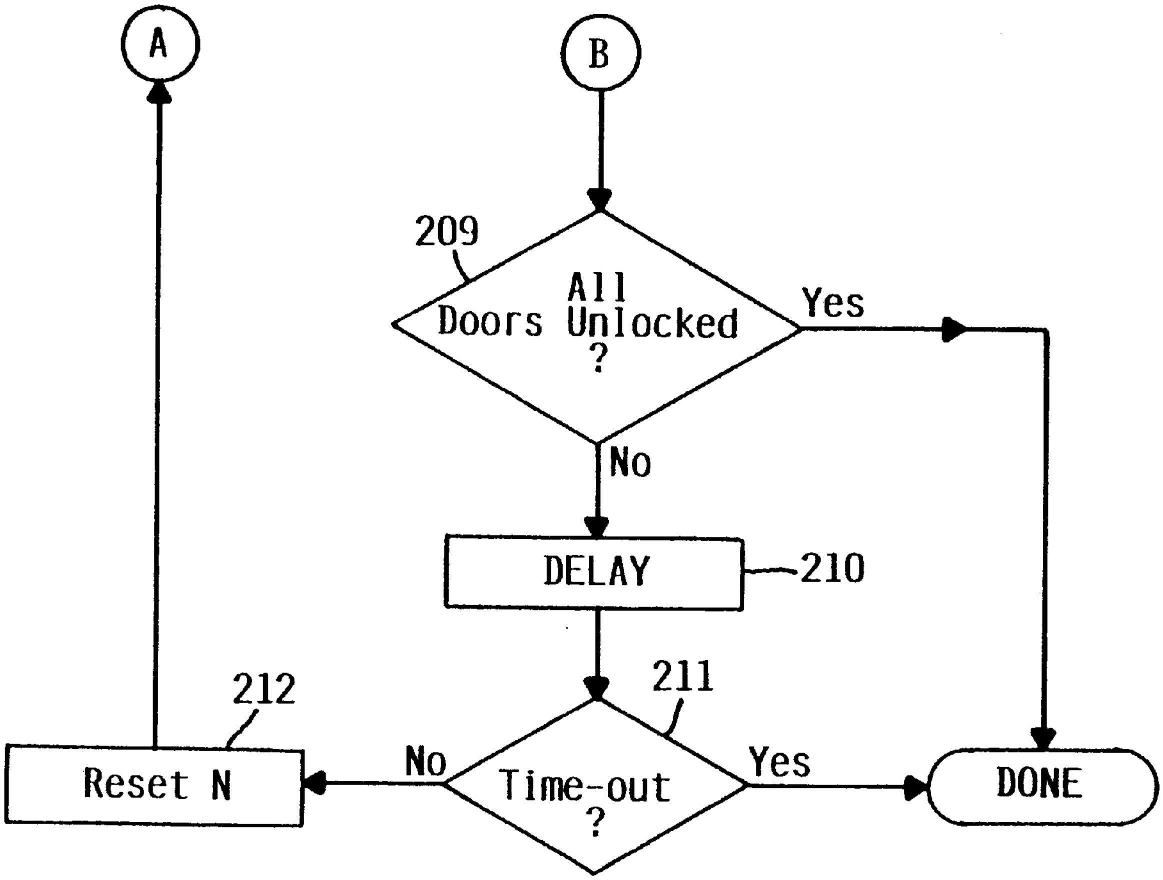

FIG. 2 is a flowchart showing the steps performed by the control program executing on microprocessor 131 to control the door latch mechanism, in accordance with the preferred embodiment. As shown in FIG. 2, the door unlocking routine is triggered by a door unlock event 201. As explained above, a door unlock event may be the user pressing a button on switch panel 105, or pressing a button on a remote portable transmitter to generate a signal received by RF receiver 108, or a predefined event such as a collision or the ignition switch being turned off. Upon detection of such an event, the control program initializes an index variable N which is used to index multiple doors, an array of flags, one for each door, indicating whether the unlock signal has been sent to the corresponding door, and a time-out timer variable (step 202).

The control program them checks each door in sequence. It increments N to the next index value (step 203). The control program then checks the flag array to determine whether an unlock signal has already been sent to Door(N) (step 204). If the signal has already been sent, steps 205–207 are by-passed. If the signal has not yet been sent, control program checks the status of the sensor(s) for Door(N) (step 205). If no sensor for Door(N) indicates a possible manual activation of the door, control program transmits a signal to the corresponding solenoid in Door(N) to unlock the door lock (step 206). It also sets the flag bit for Door(N) in the flag array, so that it will not send the same signal a second time. It then proceeds to step 208.

If at least one sensor for Door(N) indicates a possible manual activation of the door, an unlock signal is not sent. Preferably, the controller causes a speaker, buzzer, or other sound emitter (not shown) to sound an audible beep (step 207), as an informational message to the user. The user, upon hearing the beep, may be able to discern the problem more quickly. As is well known, vehicles are typically equipped with such a speaker to issue warning tones for various conditions, such as failing to buckle seat belts, leaving keys in the ignition, etc. The issuance of a beep in the case of a door lock conflict therefore does not require additional hardware, but merely requires that the controller energize the speaker at some chosen frequency.

If there are additional doors to check (step 208), the control program returns to step 203, incrementing the index variable N to check the next door. After all doors have been checked, the control program scans the flag array to determine whether any flags have not been set, i.e., whether any doors have not yet received an unlock signal (step 209). If all flags have been set, the unlock task is finished. If any flag has not been set, the control program waits for a predetermined delay period, on the order of 10 to 100 milliseconds (step 210).

During this period, it may perform other tasks. At the end of the delay, it checks the status of the time-out timer (step 211). If the time-out has not been exceeded, the control program then resets the index variable N (step 212), and returns to step 203 to check all the doors again. If the time-out has been exceeded, the door unlock task terminates.

As described above, the door unlock task unlocks all doors in response to a door unlock event. However, essentially the same algorithm could be used to unlock a single selected door or multiple selected doors, fewer than all doors. In order to accomplish this, the flag array would simply be initialized at step 202 such that the doors to be unlocked have their corresponding flag bits set to 0, while the doors which are not to be unlocked have their corresponding flag bits set to 1.

In the preferred embodiment, the time-out timer is used to terminate the unlock task if a user is pulling on the handle for an extended period of time (e.g., 5 seconds). In such a case, activation of the door unlock after such a delay may merely confuse the user. However, there may be other circumstances in which a time-out is undesirable. For example, for safety reasons it may be desirable to unlock the doors in the event of a collision. But in this case, there could well be something obstructing the door handle for a relatively long time, perhaps minutes. The door should automatically unlock whenever the obstructing condition is removed, regardless of how long it takes. Therefore, if the door unlock event is a collision, the time-out should be given some effectively infinite setting so that the control program will continue indefinitely to attempt to unlock the door.

As described herein, the controller sends an unlock signal after the door pull is released by the user. However, it would alternatively be possible to simply beep the user if the door pull is pulled out, without checking again to see whether the user has later released the handle. This is effectively the same as setting the time-out period to 0. Arguably, such an approach is less confusing to the user, although it does require the user to again press the unlock.

As described herein, doors are sensed and unlocked individually, so that if a user is engaging the door pull of Door 1, the control program will still unlock Door 2 immediately. It is possible that this behavior may also confuse the user, and therefore the control program could alternatively wait until all door pulls are in the relaxed position before sending a signal to simultaneously unlock all doors.

As described herein, a vehicle is equipped with an RF receiver for receiving external electrical signals and an interior switchpad. However, neither device is required, and alternative devices may be used to activate an electrical unlock mechanism. For example, an external keypad may be mounted on the door, requiring the user to enter a combination of numbers or other symbols in a correct sequence in order to initiate unlocking.

Although a specific embodiment of the invention has been disclosed along with certain alternatives, it will be recognized by those skilled in the art that additional variations in form and detail may be made within the scope of the following claims:

What is claimed is:

1. A vehicle door latching apparatus, comprising:

a lock for a vehicle door;

at least one mechanically activated door opening mechanism coupled to said lock;

at least one electrically activated unlocking mechanism coupled to said lock;

a sensor for detecting possible activation of said at least one mechanically activated door opening mechanism; and a control apparatus coupled to said sensor, said control interrupting said electrically activated unlocking mechanism upon detection of possible activation of said at least one mechanically activated door opening mechanism by said sensor.

2. The vehicle door latching apparatus of claim 1, wherein said control apparatus comprises a programmable processor executing a control program, said control program verifying the state of said sensor upon receipt of an electronic signal to unlock said door lock.

3. The vehicle door latching apparatus of claim 1, wherein said control apparatus, in response to an event for activating said electrically activated unlocking mechanism, waits until said sensor no longer detects possible mechanical activation of said door opening mechanism, and activates said electrically activated unlocking mechanism upon determining that said sensor no longer detects possible mechanical activation of said door opening mechanism.

4. The vehicle door latching apparatus claim 3, wherein said control apparatus, in response to an event for activating said electrically activated unlocking mechanism, waits until either (a) said sensor no longer detects possible mechanical activation of said door opening mechanism, or (b) a predefined time-out period has elapsed, whichever event occurs first, and activates said electrically activated unlocking mechanism upon determining that said sensor no longer detects possible mechanical activation of said door opening mechanism before said predefined time-out period has elapsed.

5. The vehicle door latching apparatus claim 1, wherein said control apparatus issues an audible signal upon detection of possible mechanical activation of said door opening mechanism simultaneous with an event for activating said electrically activated unlocking mechanism.

6. The vehicle door latching apparatus of claim 1, further comprising an RF frequency receiver coupled to said control apparatus, said receiver receiving a signal to activate said electrically activated unlocking mechanism.

7. The vehicle door latching apparatus of claim 1, further comprising an electrical switchpad coupled to said control apparatus, said switchpad receiving input from a user to activate said electrically activated unlocking mechanism.

8. The vehicle door latching apparatus of claim 1, wherein said control apparatus responds to at least one pre-defined automatic door unlocking event.

9. The vehicle door latching apparatus of claim 1, wherein said vehicle comprises a plurality of doors, each door having a respective lock, a respective mechanically activated door opening mechanism coupled to said lock, a respective electrically activated unlocking mechanism coupled to said lock, and a sensor for detecting possible activation of said mechanically activated door opening mechanism.

10. The vehicle door latching apparatus of claim 9, wherein said control apparatus selectively interrupts an electrically activated unlocking mechanism in a first door upon detection of possible activation of a mechanically activated door opening mechanism in said first door, and does not interrupt an electrically activated unlocking mechanism in a second door.

11. The vehicle door latching apparatus of claim 10, wherein said control apparatus, after selectively interrupting said electrically activated unlocking mechanism in said first door, waits until a sensor in said first door no longer detects possible mechanical activation of said door opening mechanism in said first door, and activates said electrically activated unlocking mechanism in said first door upon determining that said sensor no longer detects possible mechanical activation of said door opening mechanism in said first door.

12. A control apparatus for controlling a vehicle door latch, said control apparatus for activating to an electrically activated unlocking mechanism of said door latch, said control apparatus comprising:

a programmable processor;

a control program stored in a memory for executing on said programmable processor, wherein said control program, when executed by said programmable processor, causes said control apparatus to:

(a) detect possible activation of a mechanically activated door opening mechanism of said door latch from a sensor; and (b) interrupt electrical activation of said electrically activated unlocking mechanism upon detection of possible activation of a said mechanically activated door opening mechanism.

13. The control apparatus for controlling a vehicle door latch of claim 12, wherein said control program, in response to an event for activating said electrically activated unlocking mechanism, causes said control apparatus to wait until said sensor no longer detects possible mechanical activation of said door opening mechanism, and activate said electrically activated unlocking mechanism upon determining that said sensor no longer detects possible mechanical activation of said door opening mechanism.

* * * * *